INVENTOR.
Samuel A. Procter
BY
Ooms, McDougall and Hersh
Attorneys

INVENTOR.
SAMUEL A. PROCTER
BY
Oons, McDougall & Hersh
ATTORNEYS

Dec. 6, 1966 S. A. PROCTER 3,290,515

CONTROLLED PULSE PROGRESSION CIRCUITS WITH COMPLEMENTARY TRANSISTORS

Filed May 28, 1963 7 Sheets-Sheet 3

INVENTOR.
Samuel A. Procter

BY
Ooms, McDougall and Hersh
Attorneys

INVENTOR.
Samuel A. Procter
BY
Oome, McDougall and Hersh
Attorneys

INVENTOR.
Samuel A. Procter
BY Ooms, McDougall and Hersh
Attorneys

INVENTOR.
Samuel A. Procter
BY Ooms, McDougall and Hersh
Attorneys

INVENTOR.
Samuel A. Procter
BY Oons, McDougall and Hersh
Attorneys

United States Patent Office 3,290,515
Patented Dec. 6, 1966

3,290,515

CONTROLLED PULSE PROGRESSION CIRCUITS WITH COMPLEMENTARY TRANSISTORS

Samuel A. Procter, 1936 Cedar Lake Blvd., Minneapolis, Minn.

Filed May 28, 1963, Ser. No. 283,940
7 Claims. (Cl. 307—88.5)

This invention relates to new and improved pulse progression circuits which will find important applications to electronic counters, electronic stepping switches, cascade generators, and electronic devices for indicating the occurrence of events per unit time, to cite only a few examples.

One object of the present invention is to provide new and improved circuits comprising a plurality of electronic devices which are rendered successively conductive by successive input pulses.

A further object is to provide new and improved circuits of the foregoing character which utilize electronic breakdown devices, such as neon or other gaseous discharge lamps, arc discharge tubes such as Thyratrons, transistor latching circuits, or various types of solid-state devices, such as Shockley diodes, for example.

It is a further object to provide new and improved circuits of the foregoing character which are adapted generally to employ any breakdown device which has the ability to change from a substantially nonconductive state to a conductive state in response to a change in the applied voltage, but without any change in polarity, and to remain conductive at a voltage substantially lower than that required for initiation of conduction.

Another object is to provide new and improved pulse progression circuits utilizing a plurality of electronic breakdown devices connected in sequence or cascade by a plurality of coupling devices, which may include capacitors, transformers, or transistors, for example.

A further object is to provide new and improved pulse progression circuits of the foregoing character having means whereby only one of the breakdown devices can be conductive at any one time.

Another object is to provide new and improved pulse progresson circuits having a plurality of electronic breakdown devices connected in sequence by a plurality of coupling devices, together with an impedance common to all of the breakdown devices, so that only one of the devices can be conductive at any one time, and means responsive to an input pulse for rendering the conductive device nonconductive, the coupling devices being effective to produce a transfer signal which initiates conduction in the next breakdown device in the sequence, in response to the stopping of conduction in the initially conductive device, so that successive input pulses cause the breakdown devices to be successively conductive.

Another object is to provide a new and improved pulse progression circuit which may readily be arranged to provide a counter, operating with any number as the counting base, said counter generally having considerably fewer electronic components than other types of counters, such as flip-flop circuits utilizing transistors.

A further object is to provide new and improved counter or other pulse progression circuits having a sequence of stages which become conductive successively, only one of the stages being conductive at one time, so that the current consumption of the counter is greatly reduced, particularly when compared with counters using flip-flops.

Another object is to provide a new and improved transistor latching or switching circuit for use in counters, pulse progression circuits, or other electronic devices.

A further object is to provide variations of the transistor latching circuit for use as trigger circuits and pulse generators.

Further objects and advantages of the present invention will appear from the following description, taken with the accompanying drawings, in which.

Figure 6:
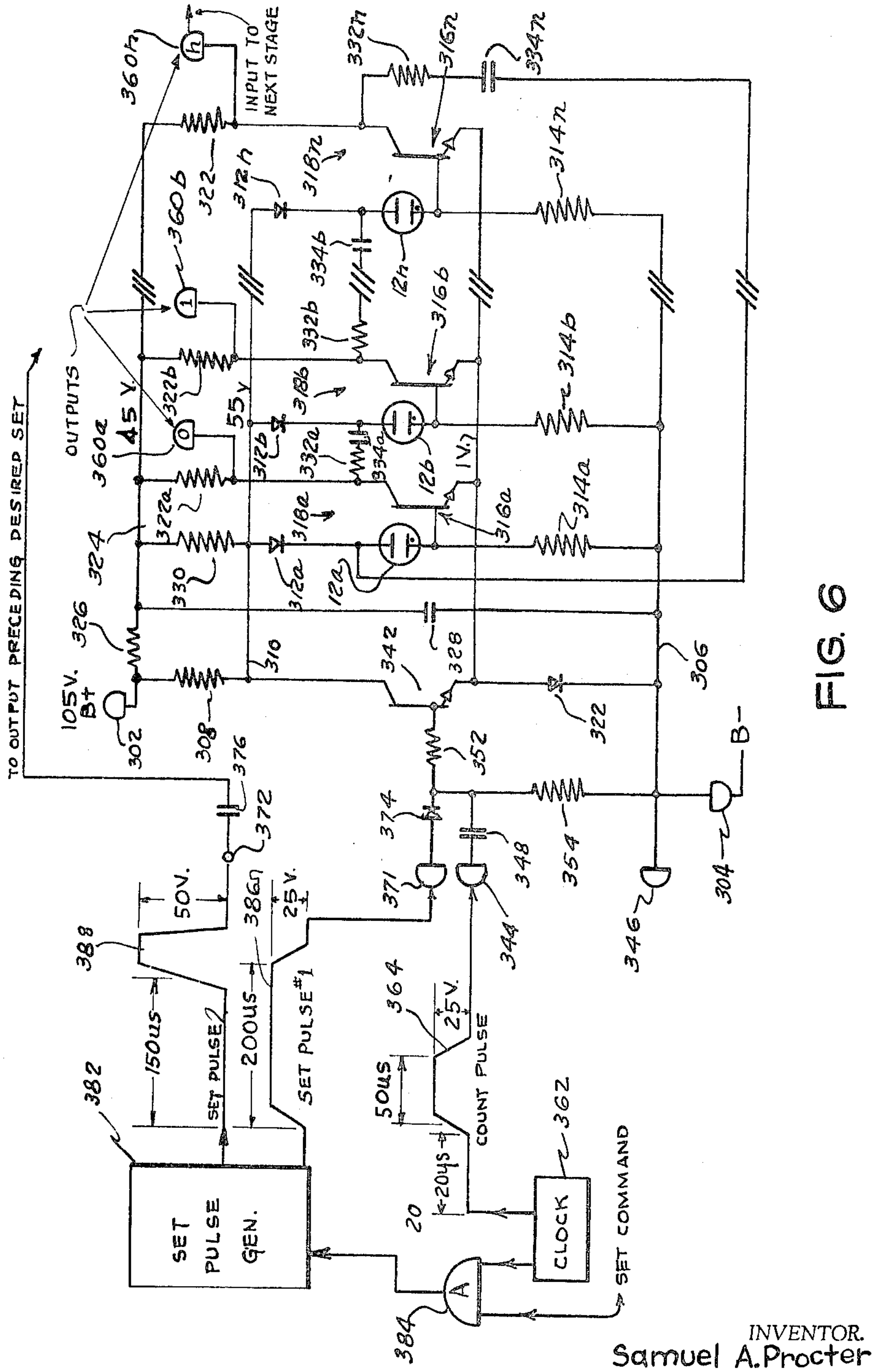
FIG. 6 is a circuit diagram of another pulse progression circuit utilizing transistors in the coupling circuits between the electronic breakdown devices.

FIGS. 7*a*, 7*b*, 8*a*, 8*b*, 9*a*, and 9*b* comprise oscillograms illustrating the wave form of various signals in the circuit of FIG. 6.

Figures 10, 10A, 10B:
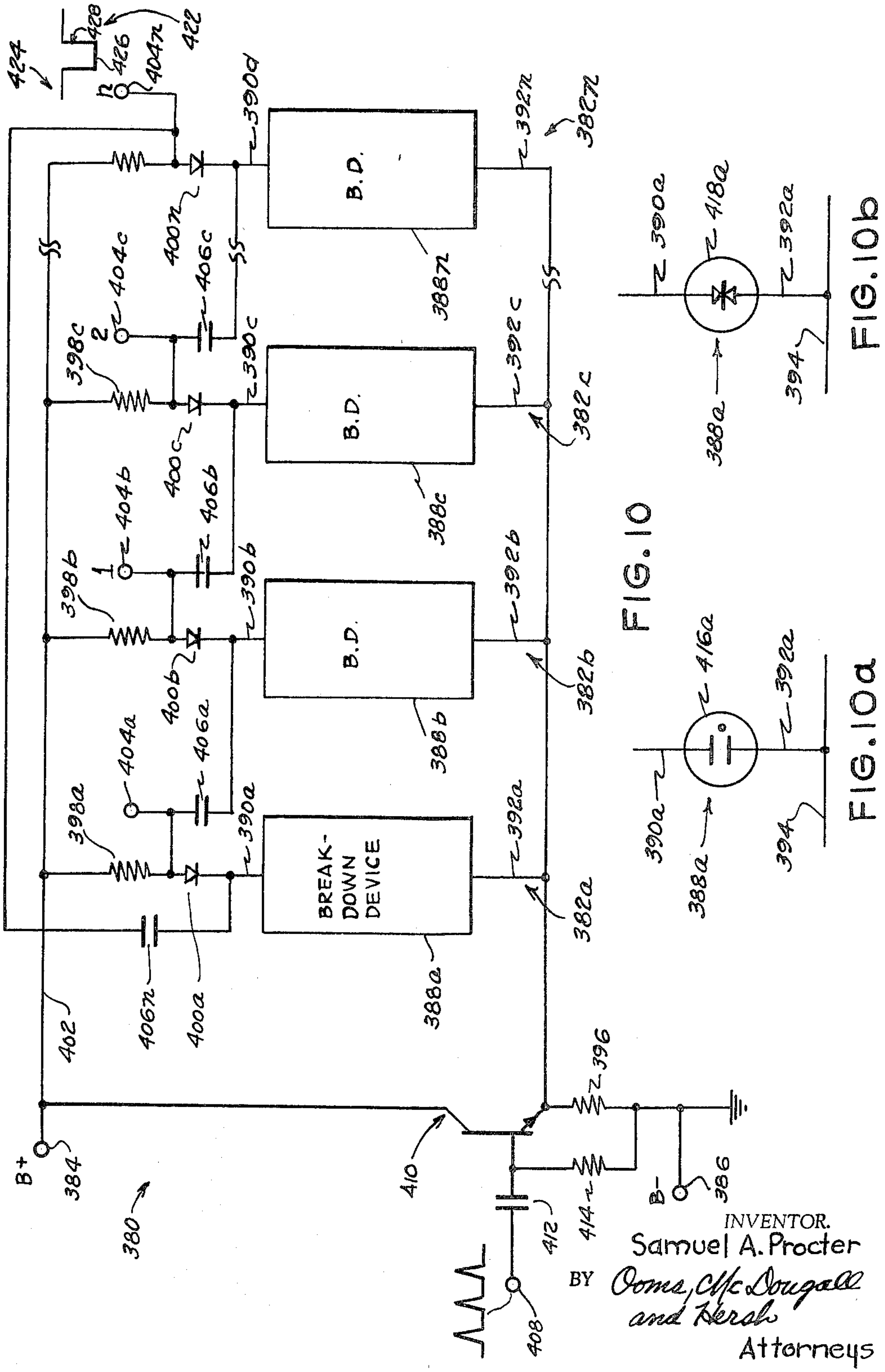

FIG. 10 is a circuit diagram of another pulse progression circuit constructed in accordance with the present invention.

FIGS. 10*a* and 10*b* are fragmentary circuit diagrams illustrating modifications of FIG. 10 utilizing different breakdown devices.

Figures 11, 11A:
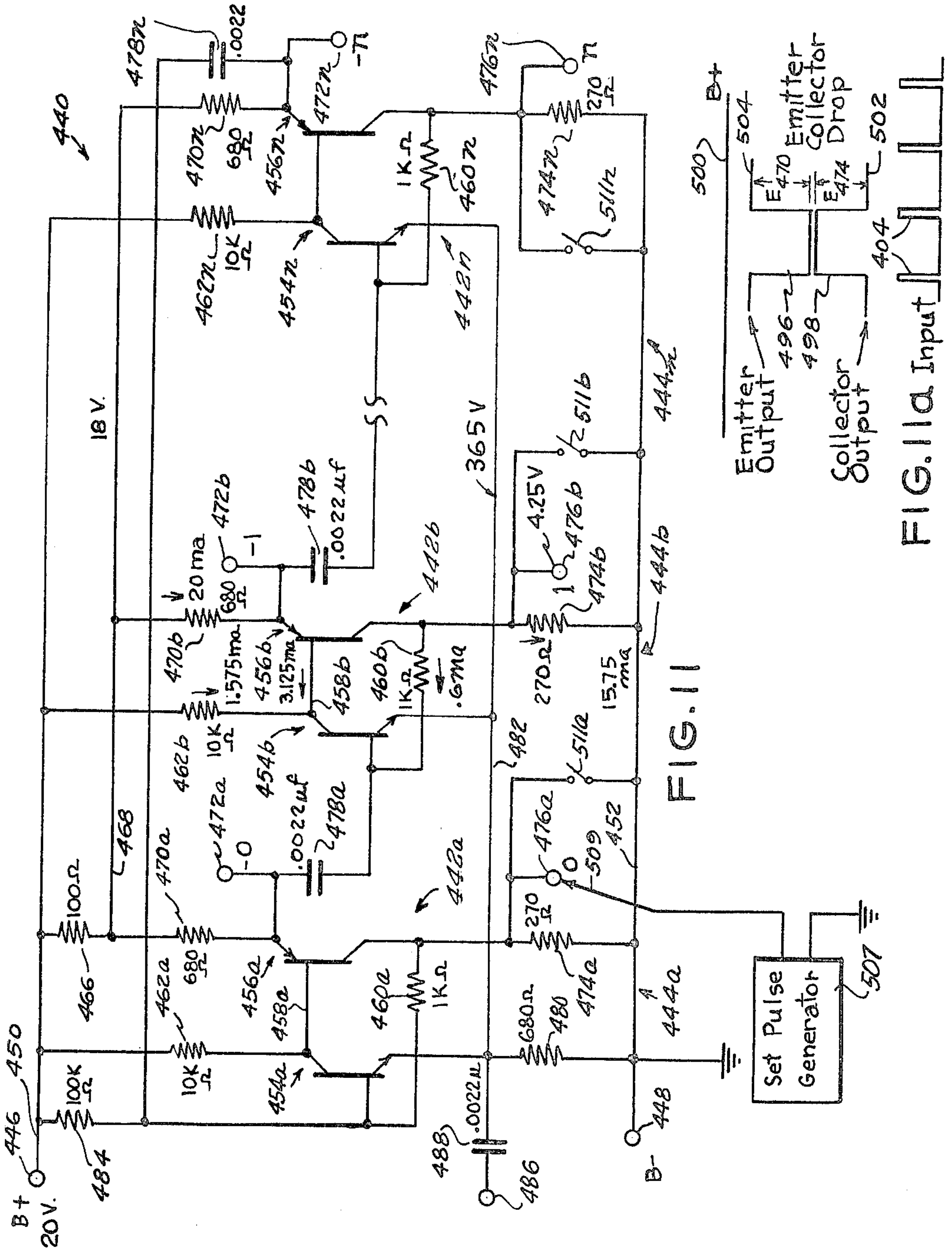

FIG. 11 is a circuit diagram of another pulse progression circuit utilizing special transistor latching circuits as the breakdown devices.

FIG. 11*a* comprises oscillograms showing the wave forms of input and output signals for the circuit of FIG. 11.

Figures 12A, 12B, 12C:
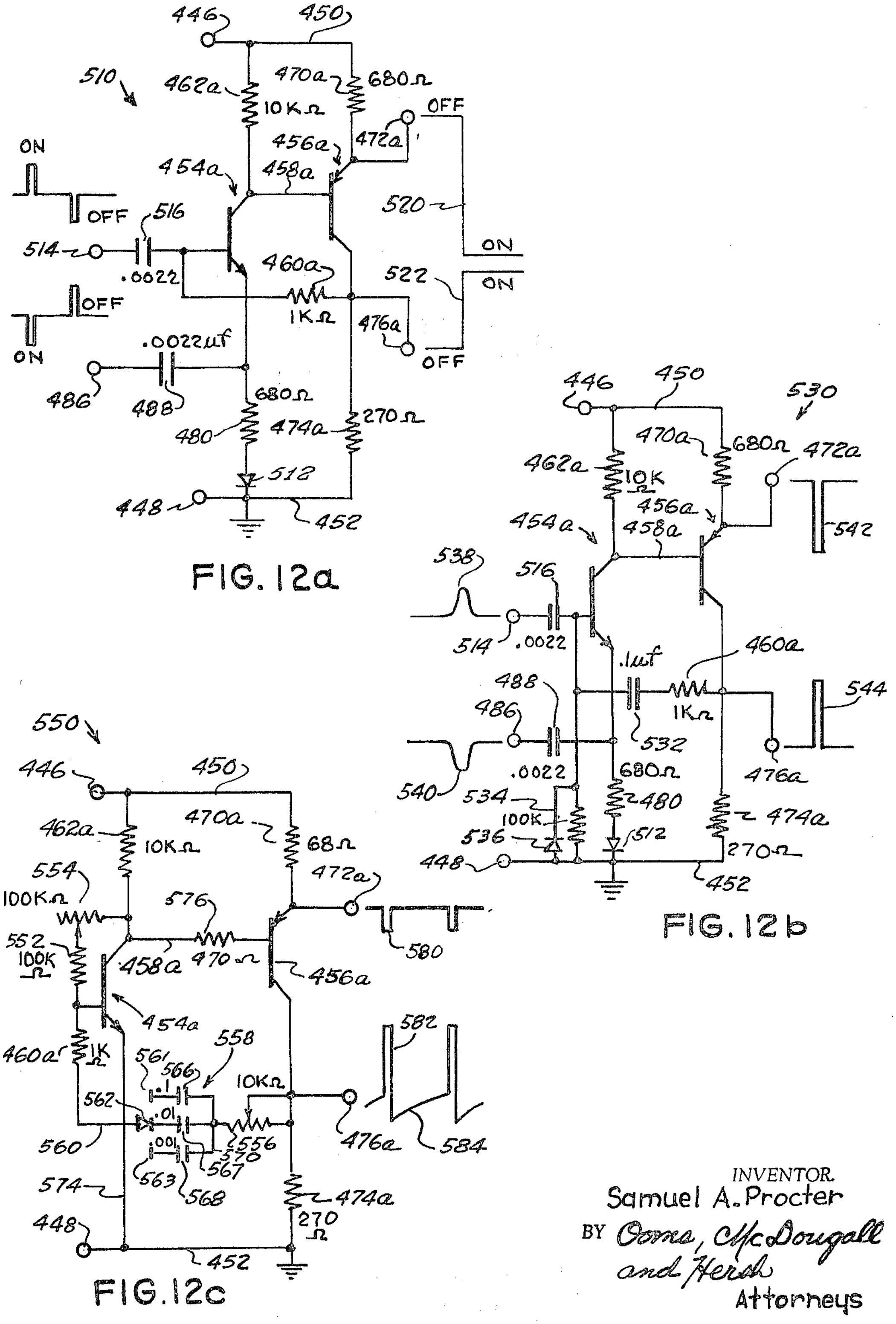

FIG. 12*a* is a circuit diagram showing the transistor latching or switching circuit as employed in FIG. 11.

FIG. 12*b* is a circuit diagram showing a modification of FIG. 12*a* to provide a trigger circuit.

FIG. 12*c* is a circuit diagram of another modification of FIG. 12*a* to provide a self-excited pulse generator.

Figures 1, 2, 3, 4:
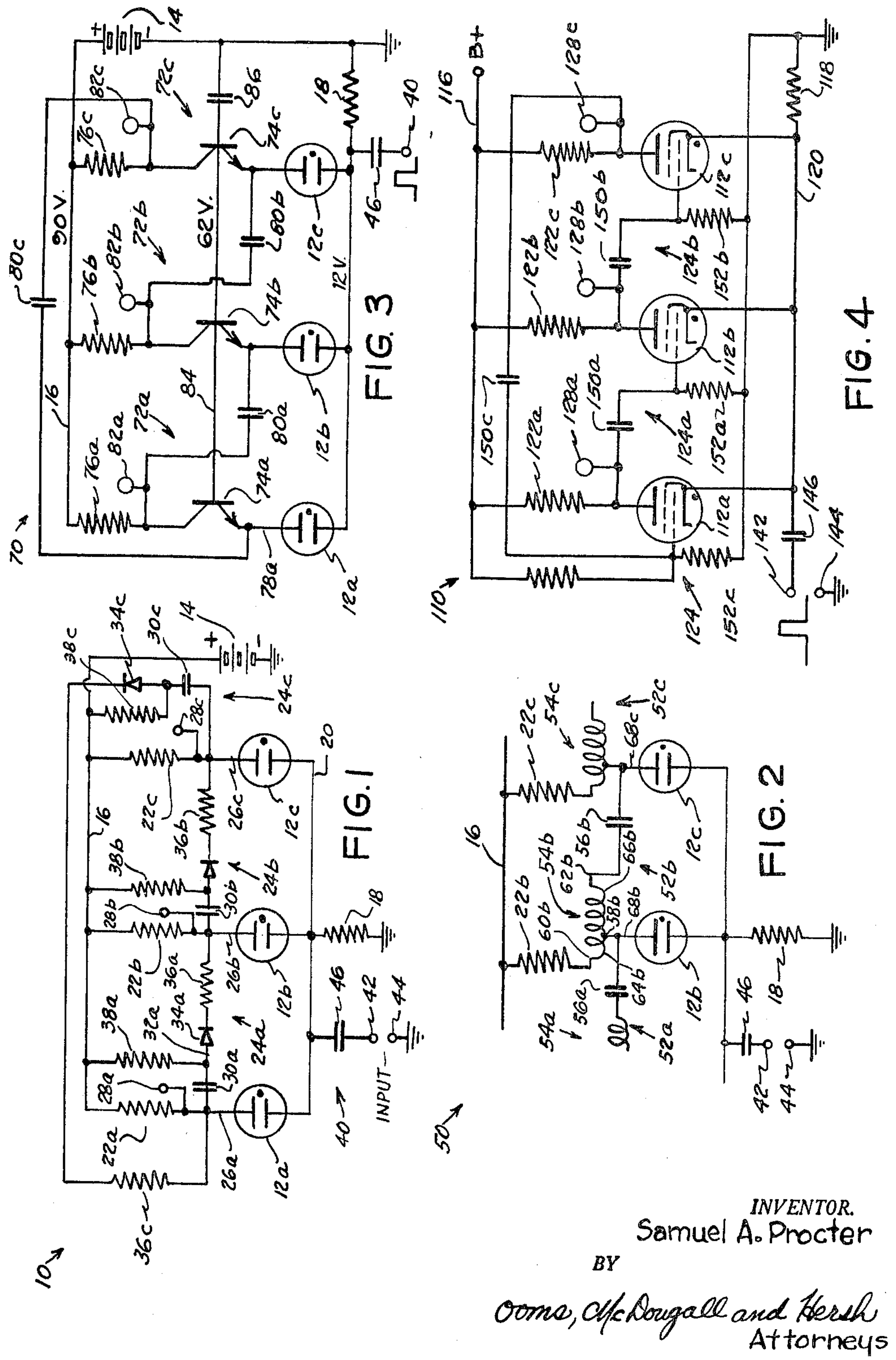
FIG. 1 is a schematic circuit diagram of a pulse progression circuit to be described as an illustrative embodiment of the present invention.
FIG. 2 is a fragmentary circuit diagram showing a modified pulse progression circuit utilizing coupling transformers between the electronic breakdown devices.
FIG. 3 is a circuit diagram of another modified pulse progression or counter circuit employing transistors in the coupling circuits between the electronic breakdown devices.
FIG. 4 is a circuit diagram illustrating another pulse progression circuit utilizing grid controller arc discharge tubes as the electronic breakdown devices.

As already indicated, FIG. 1 illustrates a pulse progression circuit 10 which constitutes an illustrative embodiment of the present invention. The illustrated circuit 10 may be characterized as an elementary counter circuit. The pulse progression or counter circuit 10 comprises a plurality of electronic breakdown devices. The illustrated circuit 10 utilizes three such breakdown devices which will be designated 12*a*, 12*b*, and 12*c* for convenient identification. However, it will be realized that any suitable number of breakdown devices may be employed, according to the number which is to be employed as the counting base. Thus, the illustrated counter is adapted to count to the base 3.

The illustrated electronic breakdown devices 12*a*–12*c* take the form of small neon glow discharge lamps, but various other types of electronic breakdown devices may be employed. Thus, the neon lamps may be replaced with other types of gaseous discharge lamps or tubes, arc discharge lamps or tubes, or solid state devices such as Shockley diodes or controlled rectifiers. In general, any such breakdown device should have the ability to change from a non-conductive state to a conductive state in response to a change in the voltage applied to the device, but without any need for a change in polarity, and the device should be able to maintain conduction at a voltage lower than the voltage required for breakdown or initiation of conduction. Of course, neon or other gaseous discharge lamps have these characteristics. Moreover, neon lamps are readily available and low in cost. Thus, neon lamps are well suited for use in the pulse progression circuit of FIG. 1. The neon lamps may be small in size and of the type commonly used for small pilot lamps.

The neon lamps 12*a*–12*c* are adapted to be energized by a battery 14 or some other source of direct current. In this case, the negative terminal of the direct-current source 14 is grounded, while the positive terminal is connected to a positive supply lead 16.

The energizing circuit for the neon lamps 12*a*–12*c* comprises a common resistor or impedance 18 which in this case is connected between ground and common lead 20 extending to one terminal of each of the neon lamps 12*a*–12*c*. Thus, any current which passes through any of the lamps must pass through the resistor 18. Load resistors 22*a*, 22*b*, and 22*c* are connected between the respective lamps 12*a*–12*c* and the positive lead 16.

The common resistor 18 is made of such a high value of resistance that only one of the neon discharge lamps 12*a*–12*c* can be conductive at any one time. A minimum current is required to maintain the electron discharge in any of the neon lamps. The resistance value of the resistor 18 is made sufficiently great, with reference to the supply voltage, to limit the current through the resistor to a value substantially less than twice the minimum discharge current for each lamp, so that the discharge can be maintained in only one lamp at a time.

The breakdown devices 12*a*–12*c* are connected in sequence or cascade by a series of coupling circuits 24*a*, 24*b*, and 24*c*. Thus, each coupling circuit 24*a*–*c* is connected between the corresponding breakdown device 12*a*–*c* and the next breakdown device in sequence. The coupling circuit 24*c* is connected between the breakdown device 12*c* and the breakdown device 12*a* so that the circuit forms a closed ring.

Leads 26*a*–*c* are connected between the respective neon tubes 12*a*–*c* and the load resistors 22*a*–22*c*. Output terminals 28*a*–*c* may be connected to the respective leads 26*a*–*c*.

In this case, all of the coupling circuits 24*a*–24*c* are the same, so that it will suffice to describe the coupling circuit 24*a* in detail. It will be seen that the coupling circuit 24*a* comprises a capacitor 30*a* which is connected between the lead 26*a* and a lead 32*a*. A diode 34*a* and a resistor 36*a* are connected in series between the lead 32*a* and the lead 26*b*. A resistor 38*a* is connected between the lead 32*a* and the positive supply lead 16.

The pulse progression device 10 is provided with an input circuit 40 for momentarily interrupting conduction in all of the breakdown devices 12*a*–*c* in response to each input pulse. In this case, the input pulses are applied across input terminals 42 and 44. A coupling capacitor 46 is connected between the input terminal 42 and the common lead 20. The other input terminal 44 is grounded. The input pulses are positive in polarity. Each of the input pulses is great enough in magnitude to reduce the voltage across the conductive lamp to a value which is insufficient to maintain the discharge in the lamp. Thus, if the neon lamp 12*a* is initially conductive, the input pulse renders the lamp 12*a* non-conductive. The coupling circuit 24*a* generates a transfer pulse which is supplied to the next lamp 12*b* in response to the stoppage of conduction in the first lamp 12*a*. The input pulse is short in duration so that the transfer pulse causes the second lamp 12*b* to break down into conduction. In the same way, the next input pulse causes the conduction to transfer from the second lamp 12*b* to the third lamp 12*c*. Thus, the lamps are successively energized in response to successive input pulses.

In the coupling circuits 24*a*–*c* of FIG. 1, the transfer pulses are produced primarily by the load resistors 22*a*–*c* and the capacitors 30*a*–*c*. Thus, when the lamp 12*a* is conductive, the capacitor 30*a* is charged to a voltage corresponding to the voltage drop across the load resistor 12*a*. When the input pulse renders the lamp 12*a* non-conductive, the voltage across the capacitor 30*a* is applied to the second lamp 12*b* through the diode 24*a* and the resistor 36*a*, so as to increase the total voltage across the second lamp. Thus, conduction is initiated in the second lamp 12*b* at the end of the input pulse. The capacitor 30*a* discharges through the resistors 22*a* and 38*a*. The second capacitor 30*b* is charged through the load resistor 22*b* and the resistor 38*b*. The diodes 34*a*–*c* cause the lamps 12*a*–*c* to be energized in the correct sequence and not in the reverse sequence. At each of the output terminals 28*a*–28*c*, a large output pulse is produced for every third input pulse. Thus, the pulse progression circuit 10 is adapted to count to three repeatedly. If a higher count is desired, successive ring counters may be connected in cascade. Thus, any of the output terminals 28*a*–*c* may be connected to the input terminal of another ring counter. Likewise, one of the output terminals of the second ring counter may be connected to the input terminal of a third ring counter, etc.

FIG. 2 illustrates a modified pulse progression circuit 50 which is similar to the circuit 10 of FIG. 1 except that the circuit 50 employs modified coupling circuits 52*a*–*c* in place of the circuits 24*a*–*c*. All of the coupling circuits 52*a*–*c* are the same, so that only the coupling circuit 52*b* may be described in detail. It will be seen that the coupling circuit 52*b* comprises a pulse transformer 54*b* and a capacitor 56*b*. The transformer 54*b* is of the auto-transformer type, having a tap 58*b* and end terminals 60*b* and 62*b*. The tap 58*b* divides the transformer 54*b* into two portions, 64*b* and 66*b*. The primary portion 64*b*, between the tap 58*b* and the end terminal 60*b*, has a relatively small number of turns, while the secondary portion 66*b* has a much larger number of turns. In this case, the load resistor 22*b* is connected to the end terminal 60*b*, while the tap 58*b* is connected to a lead 68*b* extending to one electrode of the neon lamp 12*b*. Thus, the load resistor 22*b* and the primary portion 64*b* of the transformer 54*b* are connected in series between the positive supply lead 16 and the neon lamp 12*b*. The capacitor 56*b* is connected between the other end terminal 52*b* and the lead 68*c* which extends to the next lamp 12*c*. Thus, the secondary portion 66*b* of the transformer 54*b* is connected in series with the capacitor 56*b* to the next lamp 12*c*.

When the lamp 12*b* is conductive, the discharge current through the lamp also flows through the primary portion 64*b* of the transformer 54*b*. When the next input pulse renders the lamp 12*b* non-conductive, the interruption of the current through the primary winding 64*b* generates a high voltage pulse in the secondary winding 66*b*. This pulse is transmitted to the next lamp 12*c* and causes it to become conductive at the end of the input pulse. Because of the step-up effect of the transformer in each coupling circuit, the pulse progression circuit of FIG. 2 has improved reliability so that it is insensitive to variations in the characteristics of the neon lamps, the supply voltage, and the values of the various resistors and capacitors.

FIG. 3 illustrates another modified pulse progression circuit 70 which is similar to the circuit 10 of FIG. 1, except that the circuit 70 comprises modified coupling circuits 72*a*–*c* utilizing amplifying devices 74*a*–*c*. As shown, the amplifying devices 74*a*–*c* take the form of transistors, but vacuum tubes or other amplifying devices may be employed. All of the coupling circuits 72*a*–*c* are the same, so that only the coupling device 72*a* need be described in detail. A load resistor 76*a* is connected between the positive supply lead 16 and the collector of the transistor 74*a*. The emitter of the transistor 74*a* is connected to a lead 78*a* which extends to one electrode of the neon lamp 12*a*. A coupling capacitor 80*a* is connected between the collector of the transistor 74*a* and the emitter of the transistor 74*b* for the next lamp 12*b*. An output terminal 82*a* may be connected to the collector of the transistor 74*a*.

The bases of all the transistors 74*a–c* are connected together by a common lead 84. A filtering or bypass capacitor 86 is connected between the lead 84 and ground.

It may be assumed that in the initial state of the circuit of FIG. 3, the neon lamp 12*a* is conductive while the other lamps 12*b* and 12*c* are not conductive. The common resistor 18 prevents conduction in more than one lamp at any one time. It will be observed that the transistor 74*a* is arranged with its collector-emitter path in series with the lamp 12*a*. Thus, the transistor 74*a* is conductive when the lamp 12*a* is conductive. The drop across the transistor is quite small, usually less than one volt. The base, emitter, and collector of the transistor 74*a* are all at about the same potential. Thus, the base of the transistor 74*a* assumes a voltage which is substantially equal to the total voltage drop across the lamp 12*a* and the resistor 18, plus the small drop across the transistor. By way of example, the voltage at the base of the transistor 74*a* may be about 62 volts with a power supply potential of 90 volts. The drop across the resistor 18 may be about 12 volts. The capacitor 86 is large enough to prevent any rapid changes in the voltages on the bases of the three transistors 74*a–c*. Thus, the base voltage remains at all times at about 62 volts.

As before, the positive input pulses are applied across the common resistor 18. The input pulses may have a magnitude of perhaps 20 volts, for example. The first pulse causes the lamp 12*a* to become non-conductive, so that all of the lamps are non-conductive momentarily. The interruption of the emitter current in the transistor 74*a* also causes interruption of the collector current, so that the voltage at the collector rises rapidly to the full 90 volts of the power supply. This pulse of voltage is applied by the capacitor 80*a* to the next lamp 12*b*, which thus is rendered conductive. The next input pulse transfers the conduction to the lamp 12*c*, etc., around the ring. It will be recognized that each transistor acts as a switch for its own lamp and as an amplifier or transfer device to trigger the next lamp in the sequence.

In the circuits of FIGS. 1–3, the lamp 12*a* is energized when the count is zero, three, six, etc. The lamp 12*b* becomes conductive when the count is 1, 4, 7, etc. The lamp 12*c* is energized when the count is 2, 5, 8, etc.

FIG. 4 illustrates a modified pulse progression circuit 110 which employs breakdown devices 112*a–c*, illustrated as grid-controlled arc discharge tubes, such as thyratrons, for example. It will be realized, however, that other types of breakdown devices may be employed, such as controlled solid state rectifiers, for example. The energizing voltage for the thyratrons 112*a–c* is applied between ground and a positive supply lead 116. A common resistor or impedance 118 is connected between ground and a lead 120 which is connected to the cathodes of all three thyratrons 112*a–c*. It will be realized that any desired number of thyratrons may be employed, according to the number which is to be utilized as the counting base. The resistor 118 is sufficiently high in value to insure that only one of the thyratrons 112*a–c* will be conductive at a time.

Load resistors 122*a–c* are connected between the positive supply lead 116 and the plates of the respective thyratrons 112*a–c*.

As before, positive input pulses are applied across the common resistor 118 by means of a capacitor 146 connected to an input terminal 142, the input terminal 144 being grounded.

Output terminals 128*a–c* may be connected to the plates of the thyratrons 112*a–c*. Coupling circuits or devices 124*a–c* are provided between the successive thyratrons 112*a–c*. All of the coupling circuits 124*a–c* may be the same, so that only the coupling circuit 124*a* need be described in detail. This circuit comprises a capacitor 150*a* connected between the plate of the thyratron 112*a* and the control grid or electrode of the thyratron 112*b*. A grid resistor 152*a* is connected between the grid of the thyratron 112*b* and ground.

It may be assumed initially that the thyratron 112*a* is conductive, while the other thyratrons 112*b* and 112*c* are not conductive. The first positive input pulse at the cathode of the thyratron 112*a* reduces the voltage between the plate and cathode to such an extent that the thyratron 112*a* becomes non-conductive. The rapid rise in the positive voltage at the plate of the thyratron 112*a* produces a positive voltage pulse which is transmitted by the capacitor 150*a* to the control grid of the next thyratron 112*b*. Thus, the thyratron 112*b* becomes conductive. Similarly, the next input pulse transfers the conduction to the thyratron 112*c*, and so forth around the ring.

Figure 5:
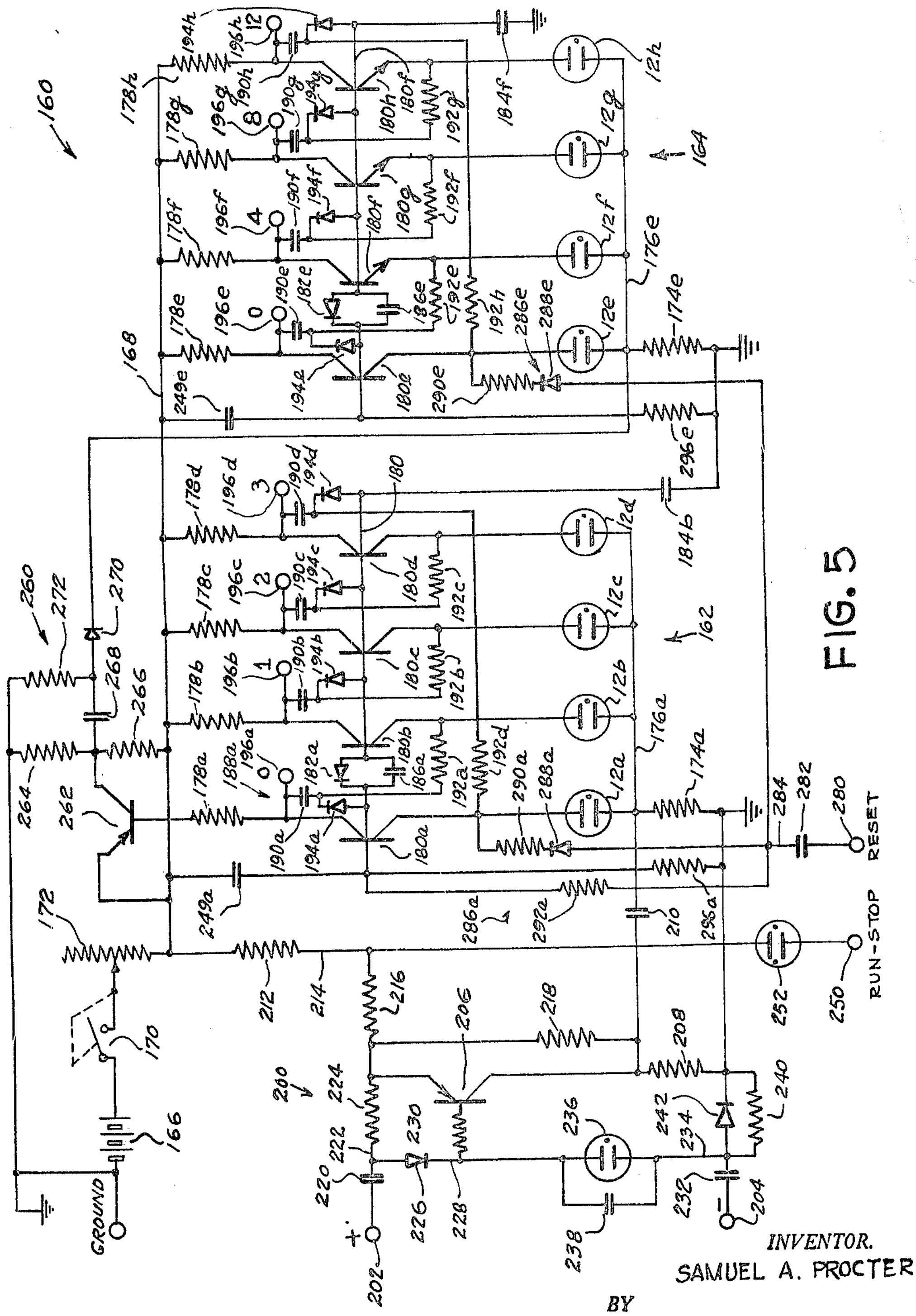
FIG. 5 is a circuit diagram of another modified pulse progression circuit arranged to provide a device which counts events per unit time.

FIG. 5 illustrates another pulse progression circuit 160 which constitutes an elaboration of the circuit of FIG. 3, particularly adapted for counting events per unit time. The circuit 116 comprises two ring counter stages 162 and 164 connected in cascade. Each counter stage employs four breakdown devices, so that a total count of 16 may be registered. Thus, the first counter stage 162 comprises breakdown devices in the form of neon lamps 12*a–d*. The counter stage 164 comprises four additional neon lamps 12*e–h*.

The two ring counters 162 and 164 are substantially the same so that only the ring counter 162 need be described in full detail. Direct current for energizing the circuit is derived from a battery or other source 166 having its negative terminal grounded. The positive terminal of the battery 166 is adapted to be connected to a positive supply lead 168 through a switch 170 connected in series with a variable resistor 172. Thus, the voltage between the supply lead 168 through a switch 170 connected in series with a variable resistor 172. Thus, the voltage between the supply lead 168 and ground may be changed by varying the resistor 172.

A common resistor or impedance 174*a* is connected between ground and a lead 176*a* connected to one side of each of the neon lamps 12*a–d*. Load resistors 178*a–d* are connected between the supply lead 168 and the collectors of the transistors 180*a–d*, except that the resistor 178*a* is connected to a circuit for supplying pulses to the second counter stage 164, as will be described in detail shortly. The emitters of the various transistors 180*a–d* are connected to the corresponding lamps 12*a–d* so that the collector-emitter path of each transistor is in series with the corresponding neon lamp. As in the case of FIG. 3, the bases of all of the transistors are connected together by the common lead 180*b*, except that a diode 182*a* is connected between the base of the transistor 180*b* and the base of the transistor 180*a*. A filtering or bypass capacitor 184*b* is connected between the lead 180*b* and ground. Another bypass capacitor 186*a* is connected across the diode 182*a*.

Coupling circuits 188*a–d* are employed to connect the neon lamps 12*a–d* in sequence. All of the coupling circuits are the same, so that only the coupling circuit 188*a* need be described in detail. It will be seen that a capacitor 190*a* and a resistor 192*a* are connected in series between the collector of the transistor 180*a* and the emitter of the transistor 180*b*. A diode 194*a* is connected between the base of the transistor 180*a* and the junction between the capacitor 190*a* and the resistor 192*a*. The resistor 192*a* limits the pulse current to the emitter of the transistor 180*b*, while the diode 194*a* prevents the transmission of any negative pulses by the coupling circuit 188*a*. The diode 182*a* permits the base of the transistor 180*a* to assume a somewhat higher biasing voltage than the bases of the other transistors 180*b–d*. Output terminals 196*a–d* may be connected to the collectors of the transistors 180*a–d*.

As in the case of the circuit of FIG. 3, the input pulses are applied to the first counter circuit 162 of FIG. 1 across the common resistor 174*a*. A pulse generating circuit 200 may be employed so as to provide positive pulses across the resistor 174*a* in response to either positive or negative going input pulses. Positive and negative going input pulses may be applied to input terminals 202 and 204, respectively. The pulse generating circuit 200 employs a transistor 206. A load resistor 208 is connected between the collector of the transistor 206 and ground. It will be seen that a coupling capacitor 210 is connected between the collector of the transistor 206 and the lead 176*a*, so as to apply pulses across the resistor 174*a*.

A resistor 212, a lead 214, and another resistor 216 are connected in series between the positive supply lead 168 and the emitter of the transistor 206. A resistor 218 may be connected between the emitter and the collector of the transistor 206.

In the illustrated circuit 200, a capacitor 220, a lead 222, and a resistor 224 are connected in series between the input terminal 202 and the emitter of the transistor 206. It will be seen that a diode 226, a lead 228, and a resistor 230 are connected between the junction lead 222 and the base of the transistor 206.

A capacitor 232, a lead 234, and a neon lamp or other gaseous discharge device 236 are connected in series between the negative input terminal 204 and the junction lead 228. A capacitor 238 is connected in parallel with the neon lamp 236. It will be seen that a resistor 240 is connected between the junction lead 234 and ground. A diode 242 is connected in parallel with the resistor 240 and is polarized to conduct positive signals to ground.

The transistor 206 is rendered conductive by either positive going pulses applied to the terminal 202 or negative going pulses applied to the terminal 204. Thus, positive pulses are produced across the load resistor 208 and are transmitted to the counter circuit 162 by the capacitor 210.

A run-stop control terminal 250 is provided to control the operation of the pulse generator 200. It will be seen that a neon lamp or other gaseous discharge device 252 is connected between the terminal 250 and the junction lead 214 in the energizing circuit for the transistor 206. If the terminal 250 is connected to ground or is supplied with zero voltage at a low impedance to ground, the lamp 252 becomes conductive and reduces the voltage supplied to the pulse generator 200 to such an extent that the pulse generator is inoperative. Thus, the transmission of pulses to the first counter 162 is stopped. If the terminal 250 is disconnected from ground or is supplied with a sufficient positive voltage, the lamp 252 becomes nonconductive, whereupon the pulse generator 200 becomes operative to transmit pulses to the first counter 162. Timing signals may be supplied to the run-stop terminal 250 when it is desired that the device of FIG. 5 be operated to count events per unit time. Thus, if a positive pulse one second in duration is supplied to the terminal 250, the counters 162 and 164 will register the number of input pulses for the one-second interval.

The second counter 164 is coupled to the first counter 162 by means of a circuit 260 comprising a transistor 262. It will be seen that the emitter of the transistor 262 is connected to the positive supply lead 168. A resistor 264 is connected between the collector of the transistor 262 and ground. The load resistor 178*a* for the transistor 180*a* is connecetd between the base of the transistor 262 and the collector of the transistor 180*a*. Thus, any current which flows through the lamp 12*a* and the transistor 180*a* will also flow between the emitter and the base of the transistor 262. A resistor 266 is connected between the positive supply lead 168 and the collector of the transistor 262. Positive pulses from the collector of the transistor 262 are transmitted to the common resistor 174*e* of the second counter 164 by a capacitor 268 and a diode 270 connected in series between the collector of the transistor 262 and the common lead 176*e* of the second counter 164. A resistor 272 may be connected between ground and the junction of the capacitor 268 and the diode 270.

When the first neon lamp 12*a* becomes conductive, current flows between the emitter and the base of the transistor 262 so that the transistor also becomes conductive between the emitter and the collector. The resulting rise in the positive voltage on the collector is transmitted as a positive pulse to the lead 176*e* so that the positive pulse is applied across the common resistor 174*e*. This causes the count registered by the second counter 164 to be increased by one step.

With this arrangement, the lamps or breakdown devices 12*a–d* register counts of zero, one, two, and three, respectively. The lamps 12*e, f, g* and *h* register counts of zero, 4, 8, and 12, respectively. At the count of 16, both counters 162 and 164 are returned to their original states, with the zero lamps 12*a* and 12*e* energized.

A reset terminal 280 may be provided to reset both of the counters 162 and 164 to zero. It will be seen that a capacitor 282 is connected between the reset terminal and a lead 284. Reset circuits 286*a* and 286*e* are connected between the leads 284 and the counters 162 and 164, respectively. Inasmuch as both reset circuits 286*a* and 286*e* are substantially the same, it will suffice to describe the circuit 286*a* in detail. It will be seen that a diode 288*a* and a resistor 290*a* are connected in series between the lead 284 and the emitter of the transistor 180*a*, so as to transmit a positive reset pulse which will be effective to cause the lamp 12*a* to become conductive. A resistor 292*a* is connected between the lead 284 and the base of the transistor 180*a*. It will be seen that a capacitor 294*a* is connected between the base of the transistor 180*a* and the positive supply lead 168. A resistor 296*a* is connected between ground and the base of the transistor 180*a*.

A large positive reset voltage or pulse applied to the terminal 280 will cause the neon lamps 12*a* and 12*e* to become conductive. Thus, both counters 162 and 164 will be reset to zero.

FIG. 6 illustrates another pulse progression circuit 300 which also employs a series of neon lamps or other breakdown devices 12*a*, 12*b* and 12*n*. It will be understood that any desired number of additional breakdown devices may be interposed between the devices 12*b* and 12*n*.

In this case, a direct energizing voltage is applied between positive and negative power supply terminals 302 and 304. A negative supply lead 306 is connected to the negative terminal 304. The voltage on the positive supply lead 302 may be approximately 105 volts.

In this case, a common resistor or impedance 308 is connected between the positive supply terminal 302 and a lead 310 from which all of the neon lamps 12*a–n* are energized. A diode 312*a* is connected between the lead 310 and one electrode of the neon lamp 12*a*. Diodes 312*b–n* are similarly connected between the lead 310 and the neon lamps 12*b–n*. Resistors 314*a–n* are connected between the negative supply lead 306 and the other electrodes of the neon lamps 12*a–n*.

Transistors or other amplifying devices 316*a–n* are employed in coupling circuits 318*a–n* between the successive neon lamps 12*a–n*. The base of the transistor 316*a* is connected to the junction between the lamp 12*a* and the resistor 314*a*, so that the resistor 314*a* serves as a base return resistor. The bases of the other resistors 316*b–n* are similarly connected to the corresponding lamps 12*b–n*.

The emitters of all of the transistors 316*a–n* are connected together by means of a lead 320. A diode 322 may be connected between the lead 320 and the negative supply lead 306 to provide a small bias, such as one volt, on the emitters.

It will be seen that a load resistor 322*a* is connected between the collector of the transistor 316*a* and a supply lead 324. Load resistors 322*b–n* are similarly connected between the supply lead 324 and the collectors of the respective transistors 316*b–n*.

A voltage dropping resistor 326 may be connected between the positive supply terminal 302 and the supply lead 324. The resistor 326 establishes a lower voltage, such as about 45 volts, between the supply lead 324 and the negative lead 306. A filtering capacitor 328 may be connected between the lead 324 and the negative lead 306. In this case, a voltage-dividing resistor 330 is connected between the common lead 310 and the supply lead 324. Initially, the voltage on the lead 310 may be established at about 55 volts.

The coupling circuit 318*a* also comprises a resistor 332*a* and a capacitor 334*a* connected in series between the collector of the transistor 316*a* and the junction between the diode 312*b* and the neon lamp 12*b*. The coupling circuits 318*b–n* comprise similarly connected resistors 332*b–n* and capacitors 334*b–n*.

The common resistor 308 is of such a high value that only one of the neon lamps 12*a–n* can be conductive at any one time. Negative input pulses applied to the line 310 will momentarily cause all of the neon lamps to be nonconductive. Thus, if the lamp 12*a* is initially conductive, a negative pulse applied to the line 310 will cause the lamp 12*a* to become nonconductive. The resulting drop in the positive voltage on the base of the transistor 316*a* causes the transistor to become nonconductive. Thus, an amplified positive pulse is generated at the collector of the transistor 316*a*. This positive pulse is transmitted by the resistor 332*a* and the capacitor 334*a* to the next neon lamp 12*b* in the sequence, so as to cause this lamp to break down and become energized. The next input pulse causes the conduction to be transferred from the neon lamp 12*b* to the next lamp in the sequence, and so forth. Thus, successive input pulses cause the neon lamps to be successively energized.

The input pulses on the line 310 are generated by a circuit 340 comprising a transistor 342 having its collector connected to the line 310. The diode 322 is connected between the emitter of the transistor 342 and the negative lead 306. Thus, the diode 322 supplies a small emitter bias for the transistor 342.

The normal input or counting pulses are applied between input terminals 344 and 346. The terminal 346 is connected to the negative supply lead 306. The terminal 344 is connected to the base of the transistor 342 through a capacitor 348, a lead 350, and a resistor 352 connected in series. A resistor 354 may be connected between the lead 350 and the negative supply lead 306.

Positive going input pulses at the input terminal 344 produce positive pulses at the base of the transistor 342 so as to render the transistor 342 conductive. The current through the collector-emitter path of the transistor 342 reduces the positive voltage on the line 310 so as to render all of the neon lamps 12*a–n* momentarily nonconductive.

Output terminals 360*a–n* may be connected to the collectors of the transistors 316*a–n*. If desired, the load resistors 322*a–n* may be replaced with the windings of relays which may be employed to control lamps or other utilization devices.

The input pulses applied to the terminal 334 may be derived from a clock or other timer 362 and may have the wave form indicated by the oscillogram 364. As shown, the input pulses have a magnitude of about 25 volts and a duration of about 15 microseconds.

It is often desirable to be able to set the counter to any desired count. For this purpose, the illustrated counter 300 of FIG. 6 is provided with two set-pulse terminals 371 and 372. An isolating diode 374 is connected between the terminal 371 and the lead 350 so that the first set pulse will be applied through the resistor 352 to the base of the transistor 342.

The second set-pulse terminal 372 is connected through a capacitor 376 to a flexible lead 380 which may be connected to any of the output terminals 360*a–n*. The lead 380 is connected to the output terminal preceding the neon lamp 12*a–n* which is to be rendered conductive.

First and second set pulses are supplied to the first and second terminals 371 and 372 by a set-pulse generator 382 which is triggered by the ordinary input pulse, supplied to the generator 382 by the clock 362 through a gating device 384. When it is desired to set the counter, a command signal is applied to the gating device 384.

The first set pulse may be of the wave form illustrated by the oscillogram 386, while the second set pulse may be of the wave form illustrated by the oscillogram 388. It will be seen that the first set pulse 386 begins while the ordinary input pulse is still in effect and continues for a considerable time interval after the ordinary input pulse has ended. Thus, the first set pulse maintains all of the neon lamps 12*a–n* nonconductive for an extended interval.

The second set pulse 388 begins near the end of the first set pulse and continues for a short interval after the termination of the first set pulse. The first set pulse 386 may be of the same amplitude as the ordinary input pulse, while the second set pulse may be of greater amplitude. The second set pulse produces a positive pulse across the neon lamp following the output terminal to which the lead 380 is connected, so that such neon lamp is rendered conductive at the termination of the first set pulse 386.

Figure 7A:
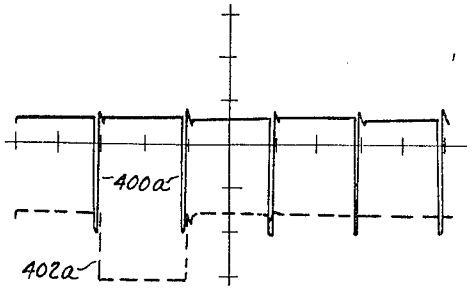

FIGS. 7*a*–9*b* comprise oscillograms showing the wave form of signals at various points in the pulse progression system of FIG. 6. Thus, FIGS. 7*a* and 7*b* include oscillograms 400*a* and 400*b*, each of which represents the wave form of the keying pulses on the lead 310. The oscillograms 400*a* and 400*b* are the same except that the oscillogram 400*b* is produced with a much faster horizontal time base than the oscillogram 400*a*. Thus, for example, the oscillogram 400*a* may be produced with a time base of .5 second per centimeter. All of the oscillograms in FIGS. 7*a*, 8*a* and 9*a* are produced with this time base. The oscillogram 400*b* may be produced with a time base of 50 microseconds per centimeter. Thus, the pulse 400*b* is spread out much wider than the pulse shown in the oscillogram 400*a*.

Figure 8A:
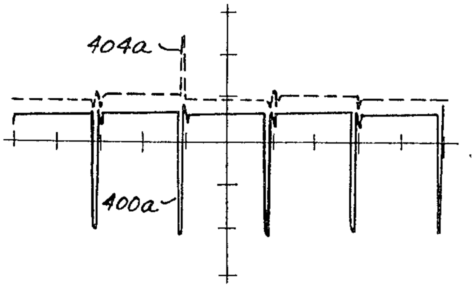
Figure 8B:
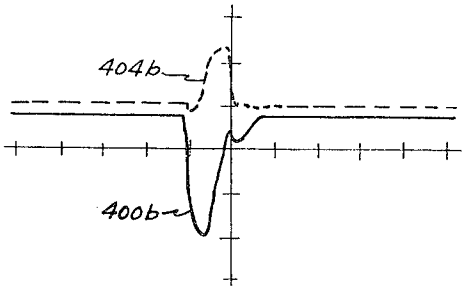
Figure 9A:
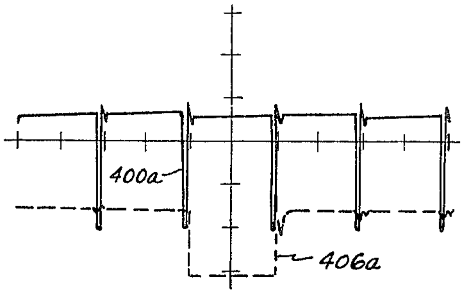
Figure 9B:
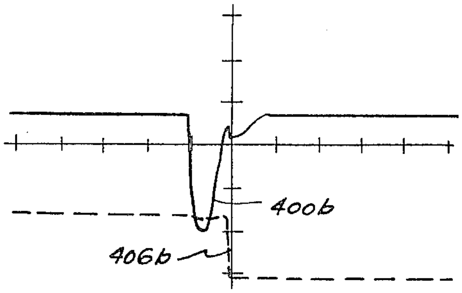

The oscillogram 400*a* is also shown in FIGS. 8*a* and 9a. Similarly, the oscillogram 400*b* is also shown in FIGS. 8*b* and 9*b*.

Figure 7B:
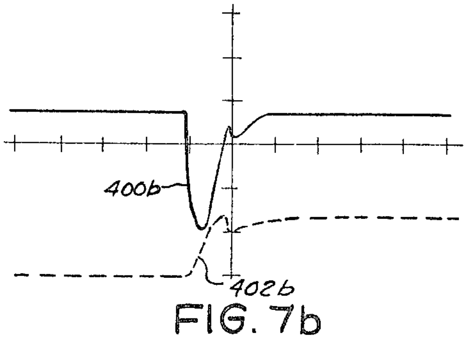

FIG. 7*a* illustrates another oscillogram 402*a* which represents the wave form of the signal at one of the output terminals, such as the output terminal 360*a*. FIG. 7*b* includes the oscillogram 402*b* which represents the same wave form drawn with a faster time base. The oscillograms of FIGS. 7*a* and 7*b* illustrate the manner in which the transistor 316*a* becomes nonconductive in response to the keying pulse.

FIG. 8*a* includes an oscillogram 404*a* representing the wave form of the transfer pulse at the anode or positive electrode of the second lamp 12*b*. This is the electrode to which the coupling capacitor 334*a* is connected. In FIG. 8*b*, the same pulse is shown in the oscillogram 404*b* produced with a faster time base.

FIG. 9*a* includes another oscillogram 406*a* representing the output signal at the next output terminal 360*b*. In FIG. 9*b*, the same signal is shown in an oscillogram 406*b* produced with a faster time base. It will be noted that the transistor 316*b* becomes conductive near the end of the keying pulse represented by the oscillogram 400*a* and 400*b*.

Those skilled in the art will readily be able to assign specific values to the various components of the circuits shown in FIGS. 1–6. However, for convenience, but without limiting the present invention, it may be noted that suitable values for the various components are listed in the following tables:

FIG. 1

| Resistors: | Ohms |
|---|---|
| 18 | 39K |
| 22*a–c* | 47K |
| 36*a–c* | 10K |
| 38*a–c* | 100K |

| Capacitors: | Microfarads |
|---|---|
| 30*a–c* | .005 |
| 46 | .005 |

Neon lamps, Type NE2.

FIG. 2

| Resistors: | Ohms |
|---|---|
| 18 | 39K |
| 22*a–c* | 47K |

| Capacitors: | Mf. |
|---|---|
| 46 | .005 |
| 56*a–c* | .005 |

Neon lamps, Type NE2.

FIG. 3

| Resistors: | Ohms |
|---|---|
| 18 | 39K |
| 76*a–c* | 100K |

| Capacitors: | Mf. |
|---|---|
| 46 | .005 |
| 80*a–c* | .0015 |
| 86 | .1 |

Neon lamps, Type NE2.

FIG. 4

| Resistors: | Ohms |
|---|---|
| 118 | 10K |
| 122*a–c* | 5.6K |
| 152*a–c* | 100K |

| Capacitors: | Mf. |
|---|---|
| 146 | .1 |
| 150*a–c* | .005 |

FIG. 5

| Resistors: | Ohms |
|---|---|
| 172 | 10K. |
| 174*a, e* | 47K. |
| 178*a–h* | 100K. |
| 192*a–h* | 100K. |
| 208 | 220K. |
| 212 | 47K. |
| 216 | 56K. |
| 218 | 100K. |
| 224 | 1 Meg. |
| 230 | 330K. |
| 240 | 1 Meg. |
| 264 | 120K. |
| 266 | 270K. |
| 272 | 220K. |
| 290*a, e* | 180K. |
| 292*a, e* | 180K. |
| 296*a* | 180K. |

| Capacitors: | Mf. |
|---|---|
| 184*b, f* | .1 |
| 186*a, e* | .1 |
| 190*a–h* | .001 |
| 210 | .005 |
| 220 | .0039 |
| 232 | .0039 |
| 238 | .001 |
| 268 | .0006 |
| 282 | .022 |
| 294*a, e* | .1 |

Neons, Type NE2.

FIG. 6

| Resistors: | Ohms |
|---|---|
| 308 | 220K |
| 314*a–n* | 100K |
| 322*a–n* | 47K |
| 326 | 82K |
| 330 | 100K |
| 332*a–n* | 100K |
| 352 | 100K |
| 354 | 47K |

| Capacitors: | Mf. |
|---|---|
| 328 | .1 |
| 334*a–n* | .0005 |
| 348 | .0005 |
| 376 | .022 |

Neons, Type NE2.
Diodes, Type Hughes 589 Silicon.
Transistors, Type TI496.

FIG. 10 illustrates another pulse progression device 380 which is arranged to serve as an electronic counter. As before, the pulse progression device 380 comprises a series of counter stages 382*a–n*. Two or more such stages may be employed. The illustrated device 380 has four stages 382*a*, 382*b*, 382*c* and 382*n*. Any desired number of additional stages may be interposed between the stages 382*c* and 382*n*. All of the stages may be substantially the same.

The pulse progression circuit or counter 380 may be energized by a source of direct current connected between positive and negative power supply terminals 384 and 386, the negative terminal 386 being connected to ground. The pulse progression stages 382*a–n* comprises corresponding breakdown devices 388*a–n* which may be of the general type already described. Thus, each of the breakdown devices 388*a–n* may take the form of a neon lamp, a Shockley solid state breakdown diode, a Thyratron arc discharge tube, or various other elements or combinations of elements exhibiting breakdown characteristics of the type already discussed. Leads 390*a–n* and 392*a–n* extend from the opposite sides of the breakdown devices 388*a–n*. All of the leads 392*a–n* are preferably connected to a common lead 394. It will be seen that a resistor or impedance 396 is connected between the lead 394 and ground. The resistor 396 is of a sufficiently high value, with relation to the power supply voltage, to insure that only one of the breakdown devices 388*a–n* will be conductive at any one time.

It will be convenient to describe other details of the pulse progression circuit 380 with reference to the first stage 382*a*, with the understanding that each of the other stages 382*b–n* is similarly arranged. Thus, in the first stage, 382*a*, a load resistor 398*a* and an isolating diode 400*a* are connected in series between the positive power supply lead 402 and the terminal lead 390*a* of the breakdown device 388*a*. The lead 402 is connected to the positive power supply terminal 384. An output terminal 404*a* is preferably connected to the junction between the load resistor 398*a* and the diode 400*a*. Coupling between the stages 382*a–n* is provided by a series of capacitors 406*a–n*. It will be seen that the capacitor 406*a* is connected between the output terminal 404*a* and the lead 390*b* extending from the breakdown device 388*b*. The other coupling capacitors 406*b–n* are similarly arranged. In particular, the capacitor 406*n* is connected between the output terminal 404*n* and the lead 390*a*. Thus, the stages 382*a–n* are connected in a closed ring arrangement.

The input pulses or other signals to be counted may be applied between an input terminal 408 and ground. In this case, an amplifying device in the form of a transistor 410 is employed to amplify the input pulses. Thus, a coupling capacitor 412 is connected between the input terminal 408 and the base of the transistor 410. The collector of the transistor 410 is connected directly to be positive power supply lead 402. As shown, the emitter of the transistor 410 is connected to the lead 394 so that the resistor 396 carries the emitter current to ground. A base return resistor 414 is connected between the base of the transistor 410 and ground.

FIG. 10*a* illustrates a modification in which the breakdown devices 388*a–n* take the form of neon lamps or other similar gaseous discharge devices. Thus, in FIG. 10*a*, a neon lamp 416*a* is connected between the terminal leads 390*a* and 392*a*. Similar lamps may be employed in the other counter stages. FIG. 10*b* illustrates another modification in which solid state breakdown devices are employed. As shown, the breakdown device 388*a* comprises a Shockley breakdown diode 418*a* connected between the lead 390*a* and 392*a*. Similar breakdown diodes may be employed in the other counter stages.

In describing the operation of the pulse progression circuit 380, it may be assumed that the first breakdown device 388*a* is initially conductive. All of the other breakdown devices 388*b–n* will be nonconductive due to the high value of the resistor 396 which limits the current to a value which will support conduction in only one of the breakdown devices.

Initially, the transistor 410 is substantially nonconductive. Each of the input pulses renders the transistor 410 conductive between the collector and the emitter. As shown, the input pulses are positively polarized and the transistor 410 is of the NPN type so as to be rendered conductive by the positive pulses. The emitter current flows through the resistor 396 and increases the voltage drop across the resistor to such an extent that the breakdown device 388*a* becomes nonconductive. The coupling capacitor 406*a* transmits a positive pulse to the positive lead 390*b* of the neon breakdown device 388*b*, with the result that the breakdown device 388*b* becomes conductive at the end of the input pulse. Each succeeding input pulse causes the conduction to be transferred to the next breakdown device in the sequence. The diodes 400*a–n* prevent the transmission of the transfer pulse to any stage other than the next stage in the sequence.

FIG. 10 includes a diagram 422 illustrating the general wave form of the output signal at the output terminal 404*n*. It will be understood that similar signals appear at the other output terminals 404*a–c*. In the diagram 422, the horizontal line 424 represents the positive supply voltage which is the level of the signal at the output terminal 404*n* when the corresponding breakdown device 388*n* is nonconductive. When the breakdown device 388*n* bcomes conductive, the voltage drops to a lower level 426 due to the drop in voltage across the load resistor 398*n*. This produces a negative going pulse 428. When the breakdown device 388*n* again becomes nonconductive, the voltage at the output terminal 404*n* returns to the original level.

It has already been indicated that combinations of circuit elements may be employed as breakdown devices. FIG. 11 illustrates a counter or pulse progression device 440 having breakdown devices 442*a–n* in the form of special electronic switching or latching circuits, each of which may comprise several circuit components. The pulse progression circuit 440 is arranged in a plurality of stages 444*a–n*.

To energize the pulse progression circuit 440, a source of direct current may be connected between positive and negative power supply terminals 446 and 448. As shown, the negative terminal 448 is connected to ground. Positive and negative supply leads 450 and 452 are connected to the terminals 446 and 448.

It will be convenient to describe certain details of the pulse progression circuit 440 with reference to the first stage 444*a*, with the understanding that the other stages 444*b–n* are similarly constructed and arranged. Thus, the first breakdown device 442*a* comprises a switching transistor 454*a* which is coupled to an output transistor 456*a*. The two transistors 454*a* and 456*a* are preferably of different types. Thus, as shown, the transistor 454*a* is of the NPN type, while the transistor 456*a* is of the PNP type. This situation could be reversed, in which case the polarity of the supply voltage would be reversed. It will be seen that the collector of the transistor 454*a* is directly coupled to the base of the transistor 456*a* by a lead 458*a*. A coupling resistor 460*a* is connected between the collector of the transistor 456*a* and the base of the transistor 454*a*.

In the illustrated circuit, a biasing resistor 462*a* is connected between the positive lead 450 and the collector of the transistor 454*a*. The resistor 462*a* is also connected through the lead 458*a* to the base of the transistor 456*a* so as to serve as a base return resistor for the output transistor 456*a*. The provision of the resistor 462*a* maintains cutoff bias on the output transistor 456*a*, particularly at elevated temperatures, when the stage 444*a* is nonconductive.

A common biasing resistor 466 is connected between the positive supply lead 450 and a common lead 468 extending to all of the stages 440*a–n*. It will be seen that a load resistor 470*a* is connected between the common lead 468 and the emitter of the output transistor 456*a*. Similarly, load resistors 470*b–n* are connected between the common lead 468 and the emitters of the corresponding output transistors 456*b–n*. An output terminal 472*a* is connected to the emitter of the output transistor 456*a*.

It will be seen that another load resistor 474*a* is connected between the collector of the output transistor 456*a* and the negative supply lead 452. An output terminal 476*a* is connected to the collector of the output transistor 456*a*.

A series of coupling capacitors 478*a–n* are employed to connect the stages 444*a–n* into a closed ring. Thus, the capacitor 478*a* is connected between the emitter of the output transistor 456*a* and the base of the switching transistor 454*b* of the next stage. The other coupling capacitors 478*b–n* are similarly connected.

To insure that only one of the stages 444*a–n* will be conductive at any one time, all of the emitters of the switching transistors 454*a–n* are provided with a common load resistor or impedance 480, connected between a common lead 482 and ground. The emitters of all of the switching transistors 454*a–n* are connected to the common lead 482.

The resistor 480 carries the emitter current of the switching transistor for the conductive stage. The resulting voltage drop across the resistor 480 acts as a bias on the switching transistor of the other nonconductive stages to maintain the other switching transistors in a nonconductive state.

In order to insure that the first stage 444*a* will be conductive initially, a biasing resistor 484 is connected between the positive supply lead and the base of the first switching transistor 454*a*. The resulting positive voltage on the base of the transistor 454*a* renders such transistor conductive when power is first applied to the pulse progression circuit 440.

Positively polarized input pulses may be applied to the pulse progression circuit 440 between an input terminal 486 and ground. As shown, a coupling capacitor 488 is connected between the input terminal 486 and the common emitter lead 482. Thus, the positive input pulses are applied to the emitters of the switching transistors 454*a–n*.

It will be assumed that the stage 444*a* is conductive initially. Both transistors 454*a* and 456*a* are conductive. The first positive input pulse raises the voltage of the emitter of the switching transistor 454*a* to such an extent that the transistor 454*a* is rendered nonconductive. At the same time, all of the other switching transistors 454*b–n* are maintained nonconductive. Except for the small current through the return resistor 462*a*, the collector current of the switching transistor 454*a* is also the base current of the output transistor **456*a*. Thus, when the switching transistor 454*a* is rendered nonconductive, the output transistor 456*a* is also rendered nonconductive. This reduces the positive voltage on the base of the switching transistor 454*a*** so that the switching transistor is latched in a nonconductive state.

The stopping of conduction between the emitter and the collector of the output transistor **456*a* causes a rise in the positive voltage at the emitter, with the result that a positive pulse is transmitted by the capacitor 478*a* to the base of the next switching transistor 454*b*. This transfer pulse causes the switching transistor 454*b* to become conductive, so that the conduction is transferred from the first stage 444*a* to the second stage 444*b*. When the switching transistor 454*b* becomes conductive, the output transistor 456*b* also becomes conductive, due to the current from the base of the output transistor 456*b* to the collector of the switching transistor 454*b*. The collector current of the transistor 456*b* provides a positive bias on the base of the switching transistor 454*b***, so that the switching transistor is latched in a conductive condition.

It will be understood that each input pulse causes the conduction to transfer from the conductive stage to the next stage in the sequence. Each input pulse is differentiated by the capacitor 488 and the resistor 480 so that the off pulse which appears across the resistor 480 represents the differential of the leading slope or rise of the input pulse. With this arrangement, the duration of the input pulse is not critical and may be anything from a design minimum of about one microsecond to infinity. Successive input pulses cause the successive stages of the pulse progression circuit to become conductive. Only one stage is conductive at any one time, so that the power consumption of the pulse progression circuit is extremely low. This is a distinct advantage, particularly when the power is derived from a battery, as in the case of portable equipment. In the case of most prior counters, such as flip-flops, at least a portion of each stage is conductive at all times. Thus, in the case of a flip-flop, one-half or the other of the stage is conductive at all times.

FIG. 11*a* comprises an oscillogram 494 of typical input pulses. FIG. 11*a* also includes oscillograms 496 and 498 showing the general wave form of the output signals at the output terminals **472*b* and 476*b*. It will be seen that the output wave form 496 at the output terminal 472*b* is in the form of a negative-going pulse, while the wave form at the output terminal 476*b* comprises a positive-going pulse. These pulses correspond to the time interval during which the transistor 456*b*** is conductive.

In FIG. 11*a*, the horizontal line 500 represents the B+ level, or the positive voltage of the power supply on the lead 450. The line 502 represents the zero level at ground. When the output transistor **456*b* is nonconductive, the voltage at the output terminal 472*b* is at a level 504 which is slightly lower than the B+ level 500, by the amount of the biasing drop across the resistor 466. When the output transistor 456*b* is conductive, the voltage at the output terminal 472*b* drops by the amount of the voltage drop across the load resistor 470*b*, due to the emitter current of the transistor 456*b***.

When the output transistor **456*b* is nonconductive, the voltage at the output terminal 476*b* is at the zero level 502. When the switching transistor 456*b* becomes conductive, the voltage at the output terminal 476*b* rises to a positive value corresponding to the voltage drop through the output resistor 474*b* due to the collector current of the transistor 456*b*. It will be understood that the output wave form 496 constitutes the emitter voltage of the output transistor 456*b*, while the output wave form 498 constitutes the collector voltage of the output transistor. When the output transistor 456*b* is conductive, the small difference between the emitter and collector voltages 496 and 498 corresponds to the small drop between the emitter and the collector of the output transistor. In FIG. 11, a typical set of current and voltage values have been set forth, for the condition in which the transistors 454*b* and 456*b*** are conductive. Typical values of resistance (in ohms) and capacitance (in microfarads) have also been added, merely by way of example.

Under certain conditions, various components of the pulse progression circuit 440 of FIG. 11 may be omitted. Thus, the capacitor **478*n* may be omitted because the biasing resistor 484 will cause the first stage 444*a* to become conductive after the last stage 444*n* becomes nonconductive. The biasing resistor 466 may be omitted in many cases, particularly if silicon transistors are employed in the pulse progression circuit. In that case, the lead 468 is connected directly to the positive supply lead 450. The base return resistors 462*a–n* may also be omitted if silicon transistors are employed. In that case, the resistors 462*a–n*** are simply removed, without any other change in the connections.

The pulse progression device or counter 440 of FIG. 11 has the additional important advantage that the device may be set to any desired count, simply by applying a setting pulse or voltage of sufficient magnitude and duration to the output terminal 476 of the stage corresponding to the desired count. Thus, for example, the first stage **444*a* may be rendered conductive by applying a sufficiently great positive setting voltage or pulse to the output terminal 476*a*. The setting pulse may be derived from a setting pulse generator 507 and may be applied to the output terminal 476*a* by a movable contact or lead 509. The setting voltage should be greater than the normal output voltage from the counter. The setting voltage picks up the collector of the output transistor 456*a* and causes current to flow through the resistor 460*a* to the base and then to the emitter of the switching transistor 454*a*. In this way, the switching transistor 454*a* is rendered conductive. As a result, the output transistor 456*a* is also conductive. Due to the mutual latching action of the transistors 454*a* and 456*a*, the stage 444*a*** is latched in a conductive state.

During the setting operation, the stage which was previously conductive is rendered nonconductive. Thus, for example, it may be assumed that the second stage **444*b* was previously conductive. The application of the setting voltage to the first stage causes the flow of sufficient emitter current in the first switching transistor 454*a* to render the second switching transistor 454*b* nonconductive by virtue of the increased voltage across the common emitter resistor 480. Thus, the second stage is turned off in much the same manner as when an input pulse causes an increase of voltage across the common emitter resistor 480**.

When the second stage **444*b* becomes nonconductive, a transfer pulse is applied to the next stage 444*n* so as to cause it to become conductive momentarily. However, the stage 444*n* cannot latch in a conductive state because of the increased voltage across the common emitter resistor 480 due to the emitter current of the first switching transistor 454*a*, produced by the setting voltage applied to the output terminal 476*a*. Thus, the stage 444*n* returns to a nonconductive state when the transfer pulse dies out. The setting voltage may then be removed from the output terminal 476*a***. It will be apparent that the duration of the setting voltage should substantially exceed the duration of the transfer pulse. Of course, the duration of the transfer pulse is dependent upon the time constant of the interstage coupling circuits of the counter.

The counter 440 of FIG. 11 has the additional important advantage that it is readily possible to cause the counter to skip a stage, simply by short-circuiting the collector output resistor 474 of the stage to be skipped. Thus, if the second stage **444*b* is to be skipped, the output terminal 475*b* is short-circuited to ground. When this is done, the counter skips over the second stage from the first stage to the third stage. The various stages 440*a–n* may be provided with short-circuiting switches or contacts 511*a–n* connected across the load resistors 474*a–n***.

The short-circuiting of the collector resistor **474*b* prevents the stage 444*b* from latching in a conductive state. Instead, the stage 444*b* becomes conductive only momentarily when it receives a transfer pulse from the first stage. Thus, the second stage serves merely as a coupling device between the first and third stages. When a transfer pulse is applied to the base of the switching transistor 454*b*, the transistors 454*b* and 456*b* become conductive. The emitter-collector current in the output transistor 456*b* is somewhat greater than usual, due to the short-circuiting of the collector resistor 474*b*. The short-circuiting of the resistor 474*b* prevents any latching current from flowing through the resistor 460*b* to the base of the switching transistor 454*b*. Thus, when the transfer pulse dies out, the transistors 454*b* and 456*b* become nonconductive. The termination of conduction in the output transistor 456*b*** produces a transfer pulse which is supplied to the next stage so that it is rendered conductive.

There are many situations in which it is desirable to cause the counter to skip a stage. For example, the counter may be employed to control a series of functions of an illuminated sign or some other apparatus. At times it may be desirable to omit one function controlled by one of the stages of the counter. This may be done simply by short-circuiting the output of such stage, whereupon the counter will skip the stage.

FIG. 12*a* illustrates the basic latching or switching circuit which is employed as a breakdown device in the pulse progression circuit of FIG. 11. The circuit of FIG. 12*a* will be designated 510. The latching circuit 510 is arranged in virtually the same manner as each of the stages **444*a–n* of the pulse progression circuit of FIG. 11, with only a few minor differences. Thus, the emitter load resistor 470*a* is connected directly to the positive power supply lead 450 in the latching circuit 510** of FIG. 12*a*. A biasing diode 512 is connected in series with the emitter return resistor 480. This biasing diode may often be omitted, particularly if silicon transistors are employed.

In addition to the input terminal 486, the latching circuit 510 may have an input terminal 514. It will be seen that a coupling capacitor 516 is connected between the input terminal 514 and the base of the switching diode **454*a*. The input terminals 486 and 514 provide two alternative inputs which make it possible to obtain opposite responses from pulses of the same polarity. Thus, a positive pulse applied to the input terminal 514 will cause both of the transistors 454*a* and 456*a* to become conductive. A positive pulse, when applied to the input terminal 486, will cause the transistors 454*a* and 456*a* to become nonconductive. Similarly, a negative pulse, when applied to the input terminal 486, will cause the transistors 454*a* and 456*a* to become conductive. When applied to the input terminal 514**, a negative pulse will cause both transistors to become nonconductive.

The latching action of the circuit 510 has already been explained but will be briefly reviewed. The switching transistor **454*a* becomes conductive when its base is driven substantially more positive than its emitter. The collector current of the transistor 454*a* causes the base of the output transistor 456*a* to be driven negative relative to its emitter, so that the transistor 456*a* also becomes conductive. It will be recalled that the switching transistor 454*a* is of the NPN type, while the output transistor 456*a* is of the PNP type. When the output transistor 456*a* is conductive, the voltage across the load resistor 474*a* provides a positive bias on the base of the transistor 454*a*, so that the transistor 454*a*** is latched in a conductive state.

The switching transistor **454*a* may be rendered nonconductive by driving its base negative relative to its emitter. The loss of the collector current of the transistor 454*a* causes the base of the output transistor 456*a* to go positive relative to the emitter, so that the transistor 456*a* also becomes nonconductive. With the loss of the collector current of the output transistor 456*a*, the positive bias on the base of the switching transistor 454*a* drops to zero so that the switching transistor 454*a* is latched in a nonconductive state. The diode 512 assists the latching action by providing a small positive bias on the emitter of the switching transistor 454*a***.

The output terminals **472*a* and 476*a* provide output signals of opposite phase polarity. Thus, when the transistors 454*a* and 456*a* become conductive, a negative-going pulse 520 is produced at the output terminal 472*a*, while a positive-going pulse 522 is produced at the output terminal 476*a*. It will be recognized that the input terminals 514 and 486 may be employed to provide a push-pull input, while the output terminals 472*a* and 476*a*** may be employed to provide a push-pull output.

FIG. 12*b* illustrates a trigger circuit 530 which is a modification of the latching circuit 510. The trigger circuit 530 has a pulse sharpening and squaring action, so that a single brief pulse of substantially square wave form is produced in response to each input pulse. The trigger circuit 530 is very similar to the latching circuit 510, with only a few changes. Thus, a capacitor 532 is connected in series with the resistor **460*a* between the collector of the output transistor 456*a* and the base of the switching transistor 454*a*. By virtue of the capacitor 532, the transistor 454*a* is latched only briefly in its conductive state. As soon as the capacitor 532 becomes charged, the latching action is lost. The switching transistor 454*a* then returns to its nonconductive state due to the drop across the emitter resistor 480 and the biasing diode 512. To provide for the charging of the capacitor 532, a return resistor 534 is connected between the base of the transistor 454*a* and ground. The resistor 534 may be shunted with a reversely polarized diode 536 to speed up the discharge of the capacitor 532 after the output transistor 456*a*** becomes nonconductive.

The input terminals 514 and 486 are adapted to receive positive and negative input pulses, respectively, which may be of rather rounded wave form, as indicated by the oscillograms 538 and 540. The trigger circuit 530 is operative in response to either or both of the input pulses 538 and 540.

In response to each input pulse, the trigger circuit 530 produces a single brief output pulse of substantially square wave form. At the output terminal **472*a*, the output pulse is of negative-going polarity, as indicated by the oscillogram 542. At the output terminal 476*a*, the output pulse is of positive-going polarity, as indicated by the oscillogram 544**.

FIG. 12*c* illustrates a pulse generator 550 constituting another variation of the basic latching circuit 510 of FIG. 12*a*. Various changes are embodied in the pulse generator 550. Thus, the pulse generator circuit 550 is made self-exciting by connecting a fixed resistor 552 and a variable resistor or potentiometer 554 in series between the collector and the base of the switching transistor **454*a*. These resistors 552 and 554 tend to drive the base positive so as to render the switching transistor 454*a*** conductive.

The circuit between the collector of the output transistor **456*a* and the base of the switching transistor 454*a* is modified to include not only the resistor 460*a* but also a variable resistor or potentiometer 556 and a selective capacitor circuit 558, the variable resistor 556 and the capacitor circuit 558 being in series with the resistor 460*a*. It will be seen that the capacitor circuit 558 comprises a switching member 560 which is movable into engagement with any one of three contacts 561, 562 and 563. Three capacitors 566, 567 and 568 of different values are connected between the respective contacts 561–3 and a common lead 570. The variable resistor 556 is connected between the common lead 570 and the collector of the output transistor 456*a*. The position of the switch 560** offsets both the width and the frequency of the output pulses.

In the pulse generator circuit 550, the emitter of the transistor 454a is returned directly to ground by a lead 574. A resistor 576 is interposed in the lead 458a between the base of the output transistor 456a and the collector of the transistor 454a.

Initially, the base of the switching transistor 454a is substantially at ground potential so that the transistor 454a is nonconductive. For convenience, it will be assumed that the capacitor 567 is in the circuit. The application of the positive power supply to the terminal 446 causes the capacitor 567 to become charged through the resistors 462a, 554, 552, 460a, 556 and 474a. The charging time constant is proportional to the total resistance of these resistors and the capacitance of the capacitor 567. After a certain delay, depending upon this time constant, the capacitor is charged to such an extent that the base of the transistor 454a becomes sufficiently positive to render the transistor conductive. The output transistor 456a in turn becomes conductive due to the collector current of the transistor 454a, which drives the base of the output transistor 456a negative relative to its emitter.

When the switching transistor 454a becomes conductive, the collector voltage drops to a very low value due to the direct connection of the emitter to ground. Thus, the capacitor 567 begins to discharge through the base-emitter path of the transistor 454a.

The collector current of the output transistor 456a produces a positive voltage across the load resistor 474a which tends to charge the capacitor 567 with a polarity opposite from its original charge. In this case, the capacitor 567 charges through the resistors 556 and 460a and the base-emitter path of the transistor 454a. The charging time constant is proportional to the total resistance and the capacitance of the capacitor 567. While the capacitor 567 is being charged by the voltage across the resistor 474a, the conduction in the transistor 454a is maintained by the charging current. Once the capacitor 567 becomes fully charged, the transistor 454a becomes nonconductive. This in turn causes the output transistor 456a to become nonconductive so that the positive voltage across the load resistor 474a drops to a low value, supported solely by the discharge of the capacitor 567. The switching transistor 454a does not again become conductive until the capacitor 567 loses its negative charge and becomes positively charged due to the positive voltage supplied by the resistors 552 and 554.

At the emitter output terminal 472a, the pulse generator 550 produces a train of negative-going pulses 580 representing the intervals of conduction of the output transistor 456a. Generally, the pulses 580 are relatively brief and are seperated by the longer intervals during which the output transistor 456a is nonconductive. The width or duration of the pulses 580 depends upon the time constant represented by the capacitance of the capacitor 567 and the total resistance of the resistors 460a and 556. Thus, the width or duration of the pulses 580 may be varied by adjusting the variable resistor 556. The interval between the pulses 580 is determined by the time constant of the capacitor 567 and the total resistance of the resistors 462a, 554, 552, 460a, 556 and 474a. Thus, the interval between the pulses may be adjusted by varying the variable resistor 554.

At the collector output terminal 476a, the output signal comprises narrow positive-going pulses 582 corresponding to the pulses 580. Between the pulses 582, the charging of the capacitor 567 produces a slope 584.

The trigger circuit 530 and the pulse generator 550 are extremely useful variations of the basic latching circuit 510. These circuits have the advantage that they are not sensitive to variations in the supply voltage and in the values of the circuit components. Thus, the circuits will operate in a positive manner over a wide range of supply voltages. Moreover, the values of the circuit components need not be maintained with a high degree of precision.

The pulse progression circuits of the present invention utilize breakdown devices which are connected in sequence and are successively rendered conductive in response to the successive input pulses. The breakdown devices may be in the form of gaseous discharge lamps, arc discharge tubes, solid-state breakdown diodes or triodes, latching circuits, or other devices having the ability to become abruptly conductive in response to a change in the applied voltage, without the need for any change of polarity. In general, the input pulses render all of the breakdown devices nonconductive momentarily. The breakdown devices are coupled together in such a manner that the interruption of conduction in any of the breakdown devices will produce a transfer signal which causes the next breakdown device in the sequence to become conductive at the end of the input pulse.

The pulse progression circuits of the present invention require only one breakdown device for each stage of the circuit. The breakdown devices may usually be in the form of small neon lamps. Thus, the cost of the breakdown devices is very small. A single transistor will provide good coupling between successive stages. Thus, the number and cost of the active electronic components per stage may be very low. The pulse progression circuits may readily be arranged to provide counters operating with any desired number as the counting base. Thus, the present invention results in electronic counters having remarkably few active electronic components to achieve a desired total count.

It will be found that the present invention is very advantageous to provide counters, stepping switches, cascade generators, and the like.

Various other modifications, alternative constructions and equivalents may be employed without departing from the true spirit and scope of the invention, as exemplified in the foregoing description and defined in the following claims.

I claim:

1. In a pulse progression circuit, the combination comprising a plurality of breakdown devices, each of said breakdown devices comprising a switching transistor and an output transistor coupled to said switching transistor for latching said switching transistor in both conductive and nonconductive states, said switching transistor also latching said output transistor in conductive and nonconductive states corresponding to said conductive and nonconductive states of said switching transistor, an energizing circuit connected to said breakdown devices and including an impedance common to all of said switching transistors for limiting conduction in said breakdown devices to only one device at any one time, an input circuit responsive to an input pulse for stopping conduction in all of said breakdown devices, coupling means connected between said devices in sequence and including means for producing a transfer signal in response to the stopping of conduction in any one of said devices for initiating conduction in the next device in the sequence, said devices thereby being rendered successively conductive in response to successive input pulses, and setting means for selectively applying a setting signal to one of said breakdown devices for latching said transistors thereof in a conductive state, said setting signal having a duration greater than said transfer signal.

2. In a pulse progression circuit, the combination comprising a plurality of breakdown devices, each of said breakdown devices comprising a transistor latching circuit having a switching transistor, an output transistor, one of said transistors being NPN and the other PNP, means coupling the output of said switching transistor to the input of said output transistor for rendering said output transistor conductive simultaneously with said switching transistor and nonconductive simultaneously therewith, means coupling the output of said output transistor to the input of said switching transistor for latching said switching transistor in both conductive and nonconductive states, an energizing circuit connected to said breakdown devices and including an impedance common to the switching transistors of all of said devices for limiting conduction in said devices to only one device at any one time, an input circuit responsive to an input pulse for stopping conduction in all of said switching transistors and thereby stopping conduction in all of said output transistors, a plurality of coupling devices connecting said breakdown devices in sequence, each coupling device being connected between the output transistor of one breakdown device and the switching transistor of the next breakdown device, said coupling devices producing transfer signals in response to the interruption of conduction in any of said output transistors for initiating conduction in the next switching transistor, said breakdown devices thereby being rendered successively conductive by successive input pulses, and means for selectively disabling one of said latching circuits to cause the corresponding breakdown device to be skipped in the sequence of conduction.

3. In a pulse progression circuit, the combination comprising a plurality of breakdown devices, each of said breakdown devices comprising a transistor latching circuit having a switching transistor, an output transistor, one of said transistors being NPN and the other PNP, means coupling the output of said switching transistor to the input of said output transistor for rendering said output transistor conductive simultaneously with said switching transistor and nonconductive simultaneously therewith, means coupling the output of said output transistor to the input of said switching transistor for latching said switching transistor in both conductive and nonconductive states, an energizing circuit connected to said breakdown devices and including an impedance common to the switching transistors of all of said devices for limiting conduction in said devices to only one device at any one time, an input circuit responsive to an input pulse for stopping conduction in all of said switching transistors and thereby stopping conduction in all of said output transistors, a plurality of coupling devices connecting said breakdown devices in sequence, each coupling device being connected between the output transistor of one breakdown device and the switching transistor of the next breakdown device, said coupling devices producing transfer signals in response to the interruption of conduction in any of said output transistors for initiating conduction in the next switching transistor, said breakdown devices thereby being rendered successively conductive by successive input pulses, and short circuiting switches for selectively disabling one of said latching circuits to cause the corresponding breakdown device to be skipped in the sequence of conduction.

4. A combination according to claim 1, in which each of said breakdown devices comprises an output impedance connected to the corresponding output transistor, and in which said setting means is constructed and arranged to apply the setting signal to the output impedance of a selected one of said breakdown devices for latching said transistors thereof in a conductive state.

5. A combination according to claim 1, in which said transistors comprise a plurality of electrodes, and in which each of said breakdown devices comprises an output impedance connected to one electrode of the corresponding output transistor, and means forming a coupling circuit between said one electrode and the corresponding switching transistor for latching said switching transistor in both conductive and nonconductive states, said setting means being constructed and arranged for selectively applying the setting signal to one of said output impedances for latching the transistors of the corresponding breakdown device in a conductive state.

6. A combination according to claim 3, in which said breakdown devices comprise respective output impedances connected to the corresponding output transistors, and in which said short circuiting switches are connected across said output impedances.

7. A combination according to claim 3, in which said transistors comprise a plurality of electrodes, and in which each of said breakdown devices comprises an output impedance connected to one electrode of the corresponding output transistor, and means forming a coupling circuit between said one electrode and the corresponding switching transistor for latching said switching transistor in both conductive and nonconductive states, said short circuiting switches being connected across said output impedances to cause the selected breakdown device to be skipped in the sequence of conduction.

References Cited by the Examiner

UNITED STATES PATENTS

| | | | |
|---|---|---|---|
| 2,512,984 | 6/1950 | Trousdale | 328—43 |
| 2,646,534 | 7/1953 | Manley | 315—84.5 |
| 2,814,762 | 11/1957 | Jackson et al. | 315—84.5 |
| 2,957,091 | 10/1960 | Pace | 307—88.5 |
| 3,021,450 | 2/1962 | Jiu | 315—84.5 |
| 3,025,415 | 3/1962 | Clapper | 307—88.5 |
| 3,121,802 | 2/1964 | Palmer | 307—88.5 |
| 3,135,875 | 6/1964 | Leightner | 307—88.5 |
| 3,158,781 | 11/1964 | Howell | 315—84.5 |
| 3,181,011 | 4/1965 | Durio | 307—88.5 |

ARTHUR GAUSS, *Primary Examiner.*

S. D. MILLER, *Assistant Examiner.*